(12) United States Patent
Michaelis et al.

(10) Patent No.: US 9,906,303 B2
(45) Date of Patent: *Feb. 27, 2018

(54) REMOTE RADIO HEADS HAVING WIRELESS JUMPER CONNECTIONS AND RELATED EQUIPMENT, SYSTEMS AND METHODS

(71) Applicant: CommScope Technologies LLC, Hickory, NC (US)

(72) Inventors: Scott Lynn Michaelis, Plano, TX (US); Morgan C. Kurk, Sachse, TX (US); Trevor M. Allen, Richardson, TX (US); Venkatesh Viswanathan, Lewisville, TX (US); George P. Vella-Coleiro, Summit, NJ (US); Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/271,570

(22) Filed: Sep. 21, 2016

(65) Prior Publication Data
US 2017/0012707 A1 Jan. 12, 2017

Related U.S. Application Data

(63) Continuation of application No. 14/708,386, filed on May 11, 2015, now Pat. No. 9,472,956.
(Continued)

(51) Int. Cl.
*H04B 10/2575* (2013.01)
*H04B 10/80* (2013.01)
(Continued)

(52) U.S. Cl.
CPC .......... *H04B 10/25753* (2013.01); *H02J 5/00* (2013.01); *H02J 5/005* (2013.01);
(Continued)

(58) Field of Classification Search
CPC .......... H04B 10/2503; H04B 10/25753; H04B 10/807; H02J 5/00; H02J 5/005; H02J 50/12; H04W 88/08
(Continued)

(56) References Cited

U.S. PATENT DOCUMENTS 4,607,389 A * 8/1986 Halgrimson .......... G05D 3/105
455/11.1
2004/0198451 A1 10/2004 Yang et al.
(Continued)

FOREIGN PATENT DOCUMENTS

| EP | 2396903 | 12/2015 |
|---|---|---|
| KR | 10-2013-0055145 A | 5/2013 |
| KR | 10-2013-0085521 A | 7/2013 |

OTHER PUBLICATIONS

International Preliminary Report on Patentability Corresponding to International Application No. PCT/US2015/030062; dated Nov. 24, 2016; 9 Pages.
(Continued)

*Primary Examiner* — Dalzid Singh
(74) *Attorney, Agent, or Firm* — Myers Bigel, P.A.

(57) ABSTRACT

Methods of operating a cellular radio are provided in which a first power supply signal is transmitted from a power supply to a wireless power unit at least in part over a power cable. A second power supply signal is wirelessly transmitted from the wireless power unit to the cellular radio to power the cellular radio. Data is transmitted from a baseband unit that is associated with the cellular radio to a wireless transceiver at least in part over a data cable. This data is
(Continued)

wirelessly transmitted from the wireless transceiver to the cellular radio. The data is then transmitted through an antenna that is coupled to the cellular radio.

14 Claims, 9 Drawing Sheets

Related U.S. Application Data

(60) Provisional application No. 61/991,689, filed on May 12, 2014.

(51) Int. Cl.

| | | |
|---|---|---|
| *H02J 50/05* | (2016.01) | |
| *H02J 50/20* | (2016.01) | |
| *H02J 50/30* | (2016.01) | |
| *H02J 50/40* | (2016.01) | |
| *H04W 88/08* | (2009.01) | |
| *H02J 5/00* | (2016.01) | |
| *H02J 50/23* | (2016.01) | |
| *H04B 10/25* | (2013.01) | |
| *H02J 50/12* | (2016.01) | |

(52) U.S. Cl.
CPC .............. *H02J 50/05* (2016.02); *H02J 50/12* (2016.02); *H02J 50/20* (2016.02); *H02J 50/23* (2016.02); *H02J 50/30* (2016.02); *H02J 50/40* (2016.02); *H04B 10/2503* (2013.01); *H04B 10/807* (2013.01); *H04W 88/08* (2013.01)

(58) Field of Classification Search
USPC .......................................................... 398/115
See application file for complete search history.

(56) References Cited

U.S. PATENT DOCUMENTS

| | | | |
|---|---|---|---|
| 2004/0208590 A1* | 10/2004 | Nabors | H04B 10/25752 398/115 |
| 2005/0226625 A1 | 10/2005 | Wake et al. | |
| 2008/0036588 A1 | 2/2008 | Iverson et al. | |
| 2010/0225272 A1* | 9/2010 | Kirby | H04B 5/00 320/108 |
| 2010/0237096 A1* | 9/2010 | Wegelin | A47K 5/1217 222/52 |
| 2012/0013198 A1* | 1/2012 | Uramoto | H02J 5/005 307/104 |
| 2013/0057205 A1* | 3/2013 | Lee | H02J 5/005 320/108 |
| 2013/0094438 A1 | 4/2013 | Ridel et al. | |
| 2013/0094549 A1 | 4/2013 | Ridel et al. | |
| 2013/0146355 A1* | 6/2013 | Strasser | G02B 6/4471 174/72 A |
| 2013/0209053 A1 | 8/2013 | Schumacher et al. | |
| 2014/0378047 A1* | 12/2014 | Kennard | H04B 7/15535 455/22 |
| 2015/0034381 A1* | 2/2015 | Harwath | H01B 7/0823 174/70 R |
| 2015/0080055 A1 | 3/2015 | Smentek et al. | |
| 2015/0109710 A1* | 4/2015 | Politis | H02G 15/113 361/119 |
| 2015/0115729 A1* | 4/2015 | Kanno | H02J 5/005 307/104 |
| 2016/0141882 A1* | 5/2016 | Ichikawa | H02J 17/00 307/104 |
| 2016/0205722 A1* | 7/2016 | Greene | A61B 5/0024 455/426.1 |

OTHER PUBLICATIONS

Morris P. Kesler, "Highly Resonant Wireless Power Transfer: Safe, Efficient and Over Distance" WiTricity Corporation, 2013.
Direct Current Resonance Method Wireless Power Transmission System Developed Using Newly Discovered Physical Phenomenon, muRata Global Site, Murata Manufacturing Co.., Ltd., http://www.murata.com/new/news_release/2013/0328/ Mar. 28, 2013.
"Wireless Power," Wikipedia, The Free Encyclopedia, http://en.wikipedia.org/wiki/Wireless_Power, Apr. 18, 2014.
Wireless Interface for BSA, ZigBee and IEEE 802.15.14, (Admitted Prior Art).
Brochure "Snap" Snap Link Serial Wireless Adapter, Synapse, Synapse Wireless, Inc., synapse-wireless.com (Admitted Prior Art).
Brochure "Wireless Fronthaul" Cloud RAN Enabler, EBlink Wireless Fronthaul Technology, www.e-blink.com (Admitted Prior Art).
International Search Report and Written Opinion corresponding to International Application No. PCT/US2015/030062; dated Aug. 21, 2015; 13 pages.
Extended European Search Report, corresponding to PCT/US2015/030062, dated Nov. 7, 2017 (8 pages).

* cited by examiner

REMOTE RADIO HEADS HAVING WIRELESS JUMPER CONNECTIONS AND RELATED EQUIPMENT, SYSTEMS AND METHODS

CROSS-REFERENCE TO RELATED APPLICATION

The present application claims priority under 35 U.S.C. § 120 as a continuation of U.S. patent application Ser. No. 14/708,386, filed May 11, 2015, which in turn claims priority under 35 U.S.C. § 119 from U.S. Provisional Application Ser. No. 61/991,689, filed May 12, 2014, the entire content of each of which is incorporated herein by reference.

FIELD OF THE INVENTION

The present invention relates generally to cellular communications systems and, more particularly, to cellular communications systems that include remote radio heads.

BACKGROUND

Cellular base stations typically include, among other things, one or more radios, baseband units, and antennas. The radio receives digital information and control signals from a baseband unit and modulates this information into a radio frequency ("RF") signal that is then transmitted through an antenna. The radio also receives RF signals from the antenna and demodulates these signals and supplies them to the baseband unit. The baseband unit processes the demodulated signals received from the radio into a format suitable for transmission over a backhaul communications system. The baseband unit also processes signals received from the backhaul communications system and supplies the processed signals to the radio. A power supply may also be provided that generates suitable direct current ("DC") power signals for powering the baseband unit and the radio.

In order to increase coverage and signal quality, the antennas in many cellular base stations are located at the top of a tower, which may be, for example, about fifty to two hundred feet tall. Conventionally, the power supply, baseband unit and radio were all located in an equipment enclosure at the bottom of the tower to provide easy access for maintenance, repair and/or later upgrades to the equipment. Coaxial cable(s) were routed from the equipment enclosure to the top of the tower. These coaxial cables carry signal transmissions between the radios and the antennas.

FIG. 1 schematically illustrates a conventional cellular base station 10. As shown in FIG. 1, the cellular base station 10 includes an equipment enclosure 20 and a tower 30. A plurality of baseband units 22 and radios 24, and a power supply 26, are located within the equipment enclosure 20 (while three baseband units 22 and radios 24 are illustrated in FIG. 1, it will be appreciated that more or less baseband units 22 and radios 24 may be provided). Three sectorized antennas 32-1, 32-2, 32-3 are located at the top of the tower 30. Three coaxial cables 34 (which are bundled together outside of the enclosure 20 to appear as a single cable) connect the respective radios 24 to the respective antennas 32-1, 32-2, 32-3. Note that herein when multiple units of an element are provided, each individual unit may be referred to individually by the reference numeral for the element followed by a dash and the number for the individual unit (e.g., antenna 32-2), while multiple units of the element may be referred to collectively by their base reference numeral (e.g., the antennas 32).

In recent years, a shift has occurred and the radios 24 are now more typically located at the top of the tower 30 in new or upgraded cellular installations. Radios 24 that are located at the top of the tower 30 are typically referred to as "remote radio heads" 24. Using remote radio heads 24 may significantly improve the quality of the cellular data signals that are transmitted and received by the cellular base station as the use of remote radio heads 24 may reduce signal transmission losses and noise. In particular, the coaxial cables 34 that connect radios 24 at the bottom of a tower 30 to antennas 32 at the top of the tower 30 may be 100-200 feet in length or more. The signal losses that may occur when radio signals at the RF frequencies used by cellular systems (e.g., 1.8 GHz, 3.0 GHz, etc.) are transmitted over such extended lengths of coaxial cable 34 may be very significant, because at these frequencies the coaxial cables 34 exhibit skin effect and dielectric losses which are considerably higher than at low frequencies. Because of this loss in signal power, the signal-to-noise ratio of the RF signals may be degraded in cellular base stations 10 that locate the radios 24 at the bottom of the tower 30 as compared to cellular base stations where remote radio heads 24 are located at the top of the tower 30 next to the antennas 32. The signals are typically transmitted between the baseband units 22 and the remote radio heads 24 in digital form over optical fibers.

FIG. 2 is a schematic diagram that illustrates a cellular base station 10' according to this newer architecture. As shown in FIG. 2, the baseband units 22 and the power supply 26 may still be located at the bottom of the tower 30 in the equipment enclosure 20. The radios 24 in the form of remote radio heads 24 are located at the top of the tower 30 immediately adjacent to the antennas 32. One or more fiber optic cables 38 that include a plurality of optical fibers connect the baseband units 22 to the remote radio heads 24. Fiber optic links may be provided between the baseband units 22 and the remote radio heads 24 because fiber optic cables may be lighter than coaxial cables, and may provide greater bandwidth and lower loss transmissions.

While the use of tower-mounted remote radio heads 24 and fiber optic cables 38 may increase bandwidth and improve signal quality, this architecture also requires that DC power be delivered to the top of the tower 30 to power the remote radio heads 24 (the antennas 32 may be passive devices that do not require an electrical power feed or may have very low power requirements such that they may be powered by a single small cable that carries control communications to the antennas 32). As shown in FIG. 2, this is typically accomplished by running a separate power cable 36 up the tower 30 that provides a DC power supply signal to the remote radio heads 24. The separate power cable 36 is typically bundled with the fiber optic cable(s) 38 so that they may be routed up the tower 30 together. The bundled cable that includes the power cable 36 and fiber optic cable(s) 38 is typically referred to as a "trunk" cable 40. The end of the trunk cable 40 at the bottom of the tower 30 is terminated into a first breakout box 42-1, and the end of the trunk cable 40 at the top of the tower 30 is terminated into a second breakout box 42-2. In some case, the ends of the trunk cable 40 may be pre-terminated into the respective breakout boxes 42-1, 42-2 at the time of manufacture.

In a typical newly-installed cellular installation, three (or more) antennas 32 are mounted on the tower 30, and six, nine or even twelve remote radio heads 24 may be mounted near the antennas 32 at the top of the tower 30. A first set of jumper cables 46 connect the baseband units 22 and the power supply 26 to the first breakout box 42-1, and a second set of jumper cables 48 connect the second breakout box 42-2 to the remote radio heads 24. Each set of jumper cables 46, 48 may include a plurality of data cables and a plurality of power cables (which in some cases may be combined into a set of composite jumper cables that each include both power and data components). A first end of each jumper cable 46 is terminated into the first breakout box 42-1, and a first end of each jumper cable 48 is terminated into the second breakout box 42-2. At least one jumper cable 48 is connected between the second breakout box 42-2 and each remote radio head 24 to provide power to the remote radio head 24 and to carry uplink and downlink communications between the remote radio head 24 and its associated baseband unit 22 at the bottom of the tower 30.

SUMMARY

Pursuant to embodiments of the present invention, methods of operating a cellular radio are provided in which a first power supply signal is transmitted from a power supply to a wireless power unit at least in part over a power cable. A second power supply signal is wirelessly transmitted from the wireless power unit to the cellular radio to power the cellular radio. Data is transmitted from a baseband unit that is associated with the cellular radio to a wireless transceiver at least in part over a data cable. This data is wirelessly transmitted from the wireless transceiver to the cellular radio. The data is then transmitted through an antenna that is coupled to the cellular radio.

In some embodiments, the wireless power unit may be part of a trunk cable assembly that includes the power cable and the data cable. For example, the wireless power unit may be part of a first cable termination that receives a first end of the trunk cable. In some embodiments, the first cable termination may include a buck converter that reduces an average voltage of the first power supply signal. The trunk cable assembly may include a second cable termination that receives a second end of the trunk cable, the second cable termination including a boost converter that increases an average voltage of the first power supply signal.

In some embodiments, the trunk cable and the first and second cable terminations may together form a sealed trunk cable assembly that cannot be opened in the field. The wireless transceiver may comprise, for example, an 802.11 transceiver, and the first cable termination may be positioned adjacent the remote radio head near the top of a tower. The first cable termination may include a flexible extension, and the wireless power unit may be within this flexible extension.

In some embodiments, the wireless power unit may be an electromagnetic induction unit, and the first cable termination may be positioned adjacent the cellular radio near the top of a tower. The data cable may comprise a fiber optic data cable, and the first cable termination may include an optical-to-electrical converter that converts an optical data signal into an electrical signal that is provided to the wireless transceiver.

In some embodiments, control signals may also be wirelessly transmitted to an antenna line device that is adjacent the cellular radio. A power supply signal may also be wirelessly provided to the antenna line device. The cellular radio and the antenna line device may be located on a tower, an antenna line device controller may be located at the bottom of the tower and may wirelessly transmit the control signals to the top of the tower, and the antenna line device may be powered at least in part by power from solar cells.

Pursuant to embodiments of the present invention, a trunk cable assembly for a cellular base station is provided that includes a conductive power cable, a wireless power unit coupled to the conductive power cable, a fiber optic data cable, an optical-to-electrical converter that is positioned to receive an optical signal output from the fiber optic data cable, and a wireless transceiver that is coupled to an output of the optical-to-electrical converter.

In some embodiments, the wireless power unit, the optical-to-electrical converter and the wireless transceiver may all be within a first cable termination that receives a first end of the conductive power cable and a first end of the fiber optic data cable. In such embodiments, a common jacket may enclose the conductive power cable and the fiber optic data cable to provide a hybrid fiber optic-power trunk cable, and the first cable termination may be a factory-sealed cable termination that prevents field access to the first ends of the conductive power cable and the fiber optic data cable. The first cable termination may include a buck converter that is configured to reduce an average voltage of a power supply signal carried by the conductive power cable. The first cable termination may also include a flexible extension, and the wireless power unit may be within the flexible extension. The trunk cable assembly may also include a second cable termination that receives a second end of the hybrid fiber optic-power trunk cable, and this second cable termination may include a boost converter that increases an average voltage of the power supply signal. The second cable termination may also include a second wireless power unit coupled to the conductive power cable, a second optical-to-electrical converter, and a second wireless transceiver that is coupled to an output of the second optical-to-electrical converter.

DETAILED DESCRIPTION

Figure 1:
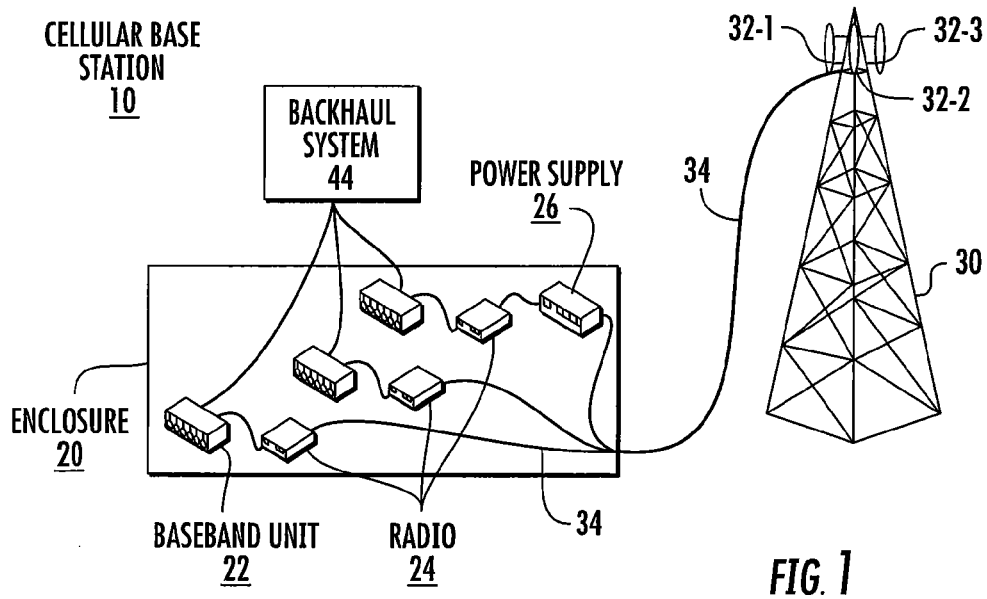
FIG. 1 is a simplified, schematic view of a conventional cellular base station architecture.

While cellular base stations that use remote radio heads and fiber optic cabling runs up the tower may exhibit improved performance, there are a number of potential difficulties with this architecture. For example, one common problem is that the trunk cable that is delivered to a cellular site may turn out to be too long or too short. If too short, the base station installation may be delayed significantly while waiting for a replacement cable. If too long, it may be necessary to provide slack cable storage with an appropriate bend radius, which can also complicate and/or delay the installation. To reduce or prevent these delays, wireless operators or their distributors may find it necessary to stock multiple lengths of cable in order to ensure that the correct cable is always available for installation. Other problems include discarded cable in the event of connector damage, difficulties in field terminating the jumper cables, ensuring that all of the jumper cables remain within their specified bend radii, the need to carefully clean the fiber optic connectors in the field, and field testing of the complete fiber optic link.

Additionally, in the above described architecture, it is necessary to connect the jumper cables at the top of the tower between the second break-out box and the remote radio heads. Typically, this is accomplished by opening the second breakout box once it is installed at the top of the tower and connecting the jumper cables to connectors in the second breakout box that receive the optical fibers and power conductors of the trunk cable. This work may be performed under cramped conditions, tens or hundreds of feet above the ground, under a variety of different environmental conditions (e.g., wind, rain, extreme heat, etc.). As such, the jumper cable connection process may be error prone and potentially very dangerous, as a fall from a cellular tower is almost always a fatal event. Accordingly, the need to terminate the jumper cables into the second break-out box at the top of the tower may significantly increase the cost and complexity of the initial installation of the cellular equipment.

Pursuant to embodiments of the present invention, "wireless jumpers" are provided that wirelessly connect a cable termination of a trunk cable that is located at the top of a cellular base station tower to a plurality of remote radio heads that are likewise located atop the tower. A "wireless jumper" refers to a wireless data connection and/or a wireless power connection that are provided between the trunk cable termination and a remote radio head or other tower-mounted equipment. The use of wireless jumpers may greatly simplify the installation of the equipment at the top of the tower.

Additionally, the use of wireless jumpers may allow sending higher voltage power signals up the power cable portion of the trunk cable. Remote radio heads may have high voltage and current requirements, such as, for example, being required to supply 20 Amperes of current at about 50 Volts DC. Cellular base station towers may also be hundreds of feet tall, and hence these power levels must be supplied over hundreds of feet of power cable. Unfortunately, when DC power is delivered over a transmission line such as a power cable, a power loss occurs that is a function of the current level of the DC power signal and the resistance of the power cable. Since the resistance may be significant over hundreds of feet of cable, high power losses can be expected when delivering DC power to the top of cellular towers. This power loss increases the cost of operating the cellular base station.

In some embodiments of the present invention, the use of wireless jumpers allow the breakout boxes that are conventionally used with trunk cables to be replaced with trunk cable terminations that may be, in some embodiments, attached to each end of a trunk cable and permanently sealed at the factory, as the use of wireless jumpers avoids any need to connect jumper cables to connectors that are located within conventional breakout boxes. Typically, the voltage of the power signal that is carried up the power cable to the top of the tower is limited because of safety concerns and/or regulations to less than 100 Volts (e.g., 80-90 Volts) to reduce the risk that technicians may be electrocuted when connecting conventional jumper cables between a breakout box and the remote radio heads. If sealed trunk cable terminations and wireless jumpers are used instead of conventional breakout boxes and jumper cables, then much higher voltage power signals may be transmitted up the power cable. As the power loss is a function of the current, which in turn is inversely proportional to the voltage, the power loss can be reduced by the use of higher voltage power signals. Thus, the use of the wireless jumpers according to embodiments of the present invention may also reduce the power losses associated with powering remote radio heads at the top of a cellular tower or remote radio heads that are at the ends of long horizontal runs such as in tunnel and/or metro-cell applications.

Remote radio heads typically are designed to be powered by a DC power source. As discussed below, wireless power transmission usually (but not always) is performed using AC power signals. Accordingly, in some embodiments of the present invention, the remote radio heads may be designed to be powered by an AC power supply signal. In other embodiments, a DC power supply signal may be transmitted to the wireless jumper, converted to an AC power supply signal, transmitted over the wireless jumper, and then converted back to a DC power supply signal that is used to power the remote radio head. In still other embodiments, an AC power supply signal may be transmitted to and through the wireless jumper, and may then be converted to a DC power supply signal that is used to power the remote radio head. In still other embodiments, DC wireless power transmission techniques may be used (e.g., a laser powered by a DC power source that shines light on a photovoltaic cell) to wirelessly transmit a DC power supply signal.

The wireless jumpers according to embodiments of the present invention may comprise a duplex wireless data connection between the trunk cable termination that is located at or near the top of the tower and each remote radio head. Typically, the data connection between a baseband unit and a remote radio head must support data rates from about 1 Gigabit/second to about 9 Gigabits/second. Any suitable wireless communications technology may be used to implement this wireless data connection including, for example, an IEEE 802.11ad wireless local area network that provides for wide bandwidth, high data rate, low power communications in the 60 GHz frequency band. Other millimeter wave wireless data applications that support the data rate requirement for the remote radio heads may alternatively be used. The tower-mounted trunk cable termination may include one or more wireless transceivers that communicate with respective wireless transceivers that are provided at each remote radio head to implement these wireless data connections. The trunk cable termination may likewise include optical-to-electrical converters and electrical-to-optical converters that place the uplink data in proper form for wireless transmission to the remote radio head and which place the downlink data received over the wireless jumper from the remote radio head in condition for transmission to the baseband unit over a fiber optic cable. In some embodiments, the remote radio heads may be modified to not include an optical transceiver and to instead just contain the wireless transceiver. This may eliminate one data conversion step, thereby simplifying operations and eliminating one possible point of noise contamination.

The wireless power transmission may be carried out in a variety of ways including, for example the use of electromagnetic coupling, electrostatic coupling, resonant electromagnetic induction, microwave power transmission, laser power transmission, etc. The wireless coupling of the power signal may be directional to provide improved efficiency. In some embodiments, the remote radio heads may be located in close proximity to the tower-mounted trunk cable termination to further improve the efficiency of the wireless power transmission.

Embodiments of the present invention will now be discussed in more detail with reference to FIGS. 3-8, in which example embodiments of the present invention are shown.

Figure 3:
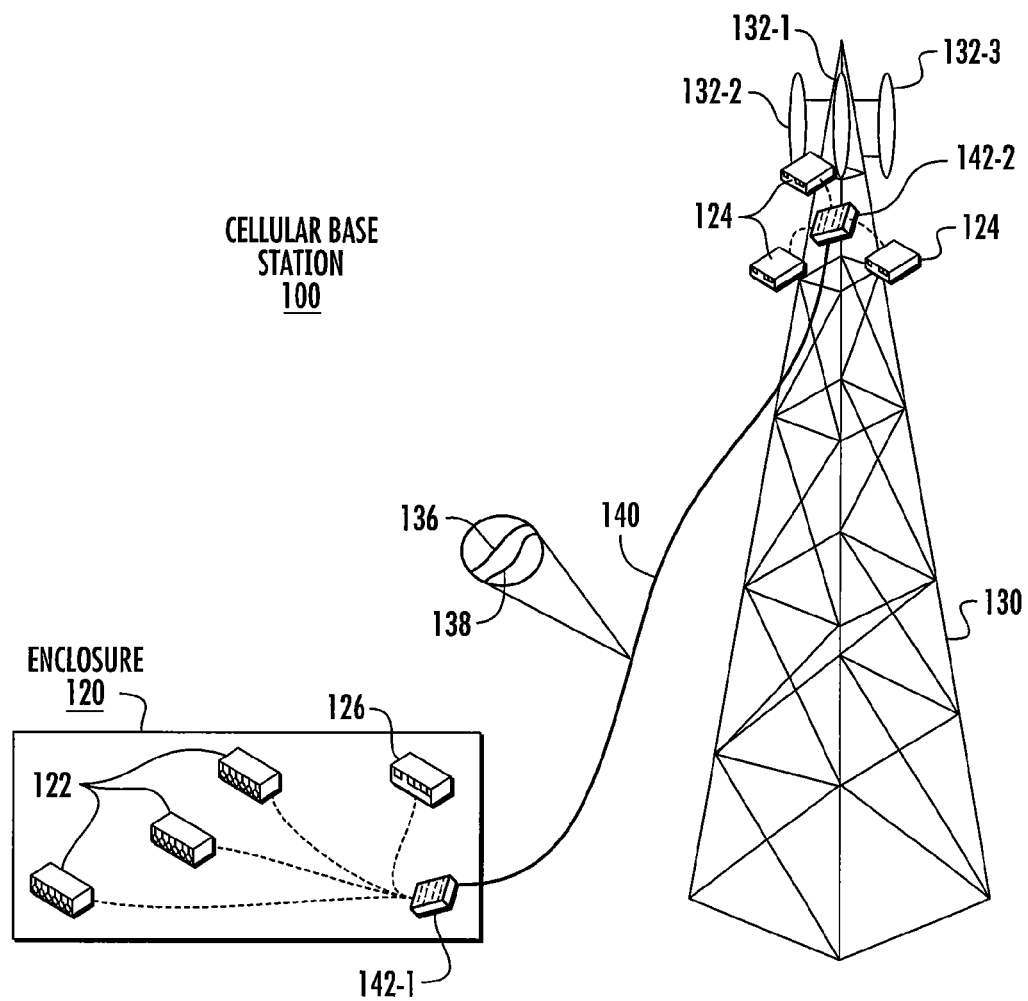
FIG. 3 is a simplified, schematic view of a cellular base station according to embodiments of the present invention.

FIG. 3 is a schematic diagram that illustrates a cellular base station 100 according to embodiments of the present invention. As shown in FIG. 3, the cellular base station 100 includes a plurality of baseband units 122 that are within an equipment enclosure 120. Each baseband unit 122 may be connected to a backhaul communications system (not shown). A power supply 126 may also be provided in the equipment enclosure 120. The equipment enclosure 120 is typically located at the bottom of a cellular tower 130. A plurality of remote radio heads 124 and three antennas 132 (e.g., three sectorized antennas 132-1, 132-2, 132-3) are mounted on the tower 130, typically near the top thereof. A trunk cable 140 is routed from the equipment enclosure 120 to the top of the tower 130. A first trunk cable termination 142-1 is connected to the first end of the trunk cable 140. The first trunk cable termination 142-1 may be located, for example, in the equipment enclosure 120. A second trunk cable termination 142-2 is connected to the other end of the trunk cable 140, and may be installed at the top of the tower 130. Together the trunk cable 140 and the trunk cable terminations 142-1, 142-2 comprise a trunk cable assembly.

Each remote radio head 124 receives digital information and control signals from a respective one of the baseband units 122 over a fiber optic data cable 138 that is part of the trunk cable 140 that is routed from the enclosure 120 to the top of the tower 130. Each remote radio head 124 modulates this information into a radio frequency ("RF") signal that is then transmitted through a respective one of the antennas 132. Each remote radio head 124 also receives RF signals from a respective one of the antennas 132 and demodulates these signals and supplies them to its respective baseband unit 122 over the fiber optic data cable 138. The baseband unit 122 processes the demodulated signals received from the remote radio head 124 and forwards the processed signals to a backhaul communications system (not shown). The baseband unit 122 also processes signals received from the backhaul communications system and supplies them to the remote radio head 124.

As shown in the callout in FIG. 3, the trunk cable 140 may include a power cable 136 and the fiber optic data cable 138. The power cable 136 may include at least two insulated conductors. In some embodiments, a pair of insulated conductors are included in the power cable 136 for each remote radio head 124. In other embodiments, only two insulated conductors may be provided, and the power supply signal may be divided into multiple power supply signals at the second cable termination 142-2 and distributed to the remote radio heads 124. In still other embodiments, a single ground conductor may be provided and separate power conductors may be provided for each remote radio head 124. Other configurations are also possible.

The fiber optic data cable 138 may include a plurality of optical fibers (not visible in FIG. 3). Typically, a pair of single-mode optical fibers are provided for each remote radio head 124, one of which carries uplink data that is transmitted from one of the baseband units 122 to the remote radio head 124 for transmission through one of the antennas 132, and the second of which carries downlink data that is received at the antenna 132, demodulated by the remote radio head 124 and transmitted to the baseband unit 122. It will be appreciated, however, that more or fewer optical fibers may be used in other embodiments, and that more than one fiber optic cable 138 may be used.

Wireless jumpers are used at the top of the tower 130 to transmit the data and power supply signals between the second cable termination 142-2 and the remote radio heads 124. These wireless connections are illustrated in FIG. 3 using dotted lines. Likewise, wireless jumpers are used at the bottom of the tower 130 to transmit the data and power supply signals between the first cable termination 142-1 and the baseband units 122 and power supply 126. In some embodiments, wired data and/or power connections may be used at the bottom of the tower 130 to connect the baseband units 122 and/or the power supply 126 to the trunk cable 140.

Figure 4:
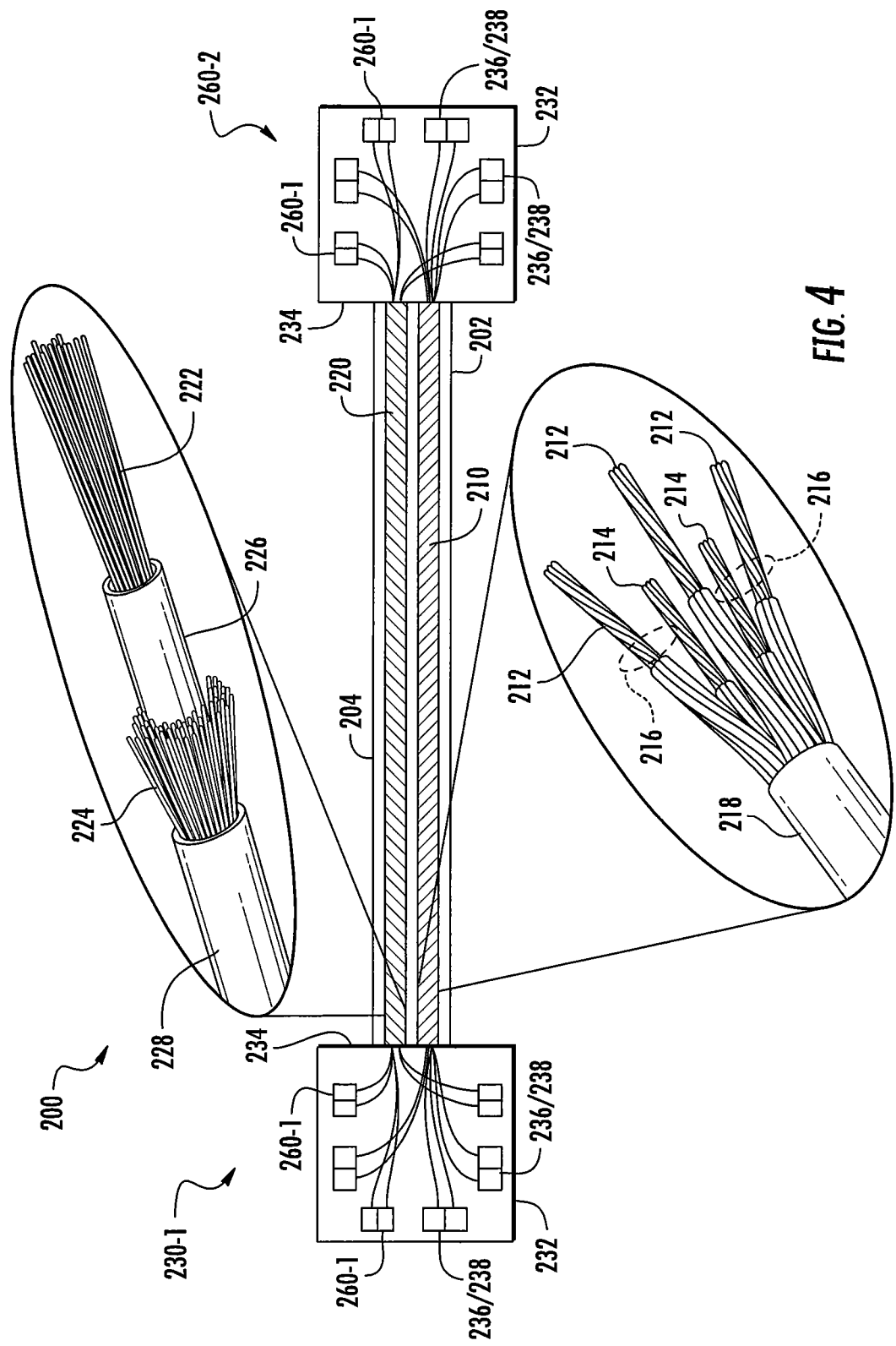
FIG. 4 is a schematic diagram of a trunk cable according to embodiments of the present invention.

FIG. 4 is a schematic diagram of a trunk cable assembly 200 according to certain embodiments of the present invention that may be used as the trunk cable assembly of FIG. 3. As shown in FIG. 4, the trunk cable assembly 200 includes a hybrid cable 202, a first cable termination 230-1 and a second cable termination 230-2. The hybrid cable 202 includes both a power cable 210 and a data cable 220. In the depicted embodiment, the power cable 210 comprises a plurality of pairs 216 of copper conductors 212, 214. Each conductor 212 may comprise a "positive" conductor that is connected to a positive port on the power supply 126, and each conductor 214 may comprise a "negative" conductor that is connected to a ground port on the power supply 126. In some embodiments, a pair 216 of conductors 212, 214 may be provided for each remote radio head 124 (three pairs 216 are provided in the embodiment of FIG. 4, although one of the conductors 214 is not visible in the view of FIG. 4). The conductors 212, 214 may be individually insulated from one another, and may be surrounded by a common jacket 218.

The data cable 220 may comprise, for example, a fiber optic cable 220 that includes a plurality of optical fibers 222 and other components such as strength fibers 224, a buffer tube 226 and a jacket 228. The power cable 210 and the data cable 220 may be contained within a common protective jacket 204.

The second cable termination 230-2 may comprise, for example, a factory-sealed enclosure 232 that receives the hybrid cable 202 through an aperture 234 on one side of the enclosure 232. The remote radio heads 124 will typically be positioned on different sides of the enclosure 232. The pairs 216 of conductors 212, 214 of the power cable 210 may be separated within the enclosure 232, and each pair 216 may be routed to a different side of the enclosure 232 that is adjacent one of the remote radio heads 124 to provide a power connection to the respective remote radio head 124.

As discussed above, a wireless power connection may be used to transmit the power supply signal between each pair of conductors 212, 214 and a respective one of the remote radio heads 124. Accordingly, a wireless power transmission device 236 may be connected to each conductor 212. Likewise, a wireless power reception device 238 may be coupled to each conductor 214. The wireless power transmission and reception devices 236, 238 may couple a power supply signal to corresponding wireless power transmission and reception devices 236, 238 that may be provided at each remote radio head 124 (not shown in FIG. 4). The wireless power transmission and reception devices 236, 238 form a wireless power unit 236/238 that may be used to wirelessly transmit a power supply signal from the second cable termination 230-2 to a remote radio head 124.

As noted above, remote radio heads 124 typically are designed to be powered by a DC power source. However, most wireless power transmission techniques couple AC as opposed to DC power supply signals. Accordingly, in some embodiments of the present invention, the remote radio heads 124 may be designed to be powered by an AC power supply signal, and the power supply 126 may output an AC power supply signal that is transmitted to the second cable termination 230-2 for wireless transmission to a remote radio head 124. In other embodiments, a DC power supply signal may be transmitted to the second cable termination 230-2, where it is converted to an AC power supply signal by a DC-to-AC power conversion circuit. The DC-to-AC power conversion circuit may, for example, be part of the wireless power unit 236/238. The second cable termination 230-2 wirelessly transmits this AC power supply signal to the remote radio head 124, where it is converted back to a DC power supply signal by a corresponding AC-to-DC conversion circuit in the remote radio head 124. In still other embodiments, an AC power supply signal may be transmitted from the power supply 126 to the second cable termination 230-2 where it is wirelessly transmitted to the remote radio head 124. The remote radio head 124 may again include an AC-to-DC power conversion circuit that converts this AC power supply signal to a DC power supply signal that is used to power the remote radio head 124. It will be appreciated that in embodiments which include AC-to-DC or DC-to-AC power conversion, such power conversion will be done on both the positive and negative legs of the circuit. In still other embodiments, techniques may be used to wirelessly transmit a DC power supply signal so that AC-to-DC or DC-to-AC power conversion is not necessary.

Figure 5A:
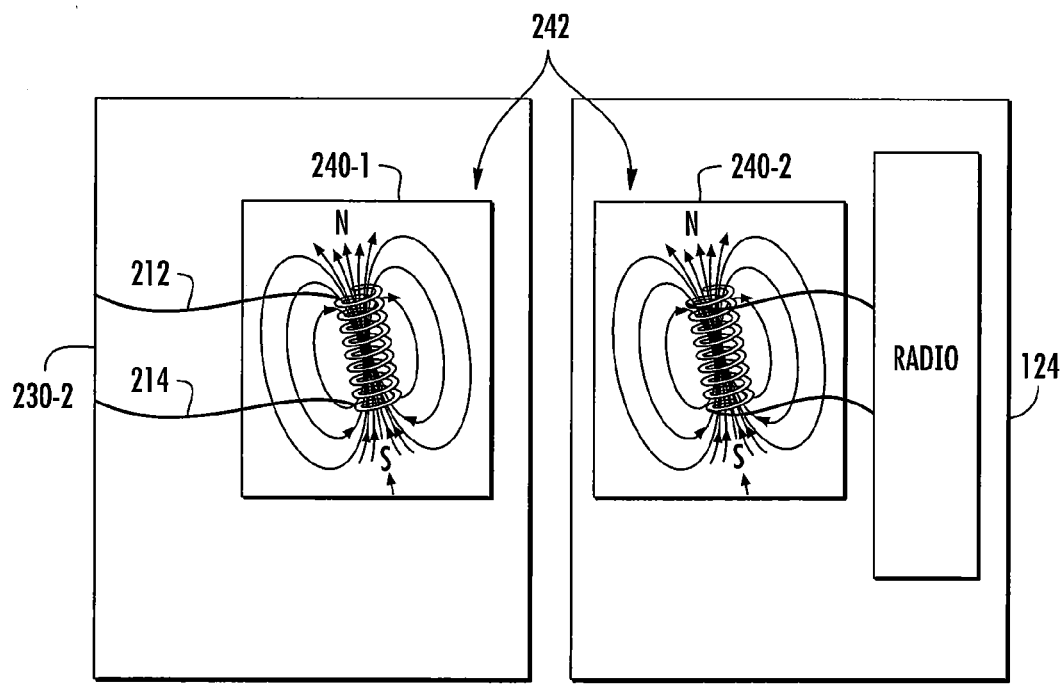
FIGS. 5A and 5B are schematic block diagrams illustrating two different wireless power transmission techniques that may be used in embodiments of the present invention.

The wireless power connection may be implemented in a variety of different ways. For example, in some embodiments, electromagnetic induction may be used to transmit the power supply signal between each pair of power conductors 212, 214 and a corresponding pair of power conductors in each respective remote radio head 124. As shown in FIG. 5A, in such embodiments, the wireless power transmission device 236 and the wireless power reception device 238 that are included in the second cable termination 230-2 of the trunk cable assembly 200 of FIG. 4 may be implemented as a primary coil 240-1 or other inductor that is electrically connected to the conductors 212, 214. The remote radio head 124 includes a secondary coil 240-2 that likewise acts as a combination wireless power transmission device 236 and wireless power reception device 238. The current flowing through the primary coil 240-1 creates a magnetic field. The magnetic field generated by the primary coil 240-1 induces a current in the secondary coil 240-2. This current may be used to power the remote radio head 124. Thus, the primary coil 240-1 and the secondary coil 240-2 together form an electrical transformer 242 that performs the wireless power transmission. Electrical transformers are widely used today for wireless power transmission over very short distances such as, for example, for charging batteries in cellular telephones and laptop and tablet computers, and other appliances such as electric toothbrushes and electric razors. The primary difficulty with this type of wireless power transmission is that it becomes highly inefficient with increasing distance between the primary and secondary coils 240-1, 240-2. Accordingly, each pair of coils 240-1, 240-2 may be located in close proximity.

The application of resonance may increase the transmission range for wireless power transmission. For example, with reference to the embodiment of FIG. 5A, with resonant coupling, the primary coil 240-1 and the secondary coil 240-2 may be tuned to the same natural frequency. Resonant magnetic coupling may transfer power over relatively large distances, potentially with high efficiency levels. The wireless power transmission circuitry may be designed so that the magnetic field generated by the primary coil interacts only weakly with other objects on the tower while coupling heavily with the secondary coil. For example, WiTricity advertises wireless power systems that use resonant magnetic coupling to provide highly efficient energy transfer over extended distances at power levels ranging up to several kilowatts. Moreover, the electric fields generated by the power supply source (here the primary coils 240-1) may be contained almost completely within the source, thereby avoiding radio frequency emissions that might otherwise interfere with the wireless communications between the cable terminations and the remote radio heads and/or the wireless transmissions through the base station antennas. Resonant magnetic coupling may also be designed to wrap around metallic objects that might otherwise block the magnetic fields. Performance may be improved further by using a non-sinusoidal drive current. In such embodiments, the primary and secondary coils 240-1, 240-2 may comprise, for example, solenoids or flat spirals with parallel capacitors that form mutually-tuned LC circuits. In this approach an alternating current ("AC") power signal may be supplied from the power supply 126 to the second cable termination 230-2, and thus AC-to-DC and DC-to-AC conversion may need to be performed in the remote radio heads 124 if the remote radio heads 124 are designed to run on DC power signals.

Figure 5B:
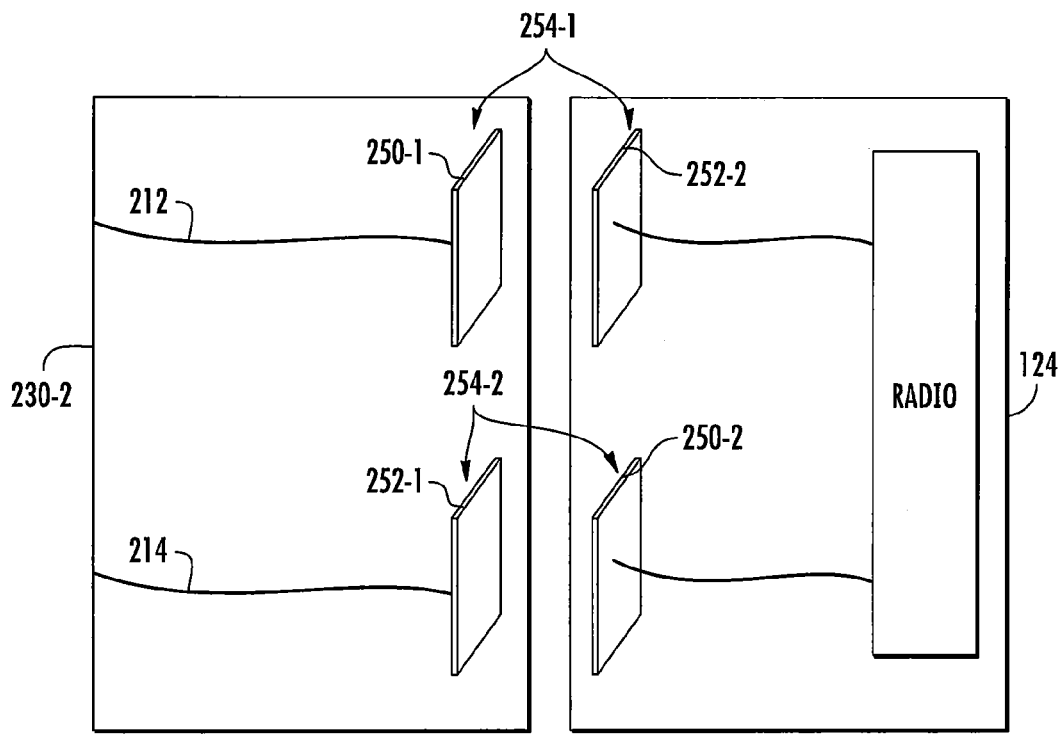

In other embodiments, the wireless power transmission may be performed via electrostatic induction (i.e., capacitive coupling). As shown in FIG. 5B, in this approach, the wireless power transmission device 236 that is included in the second cable termination 230-2 of the trunk cable assembly 200 of FIG. 4 may be implemented as a first electrode 250-1 of a first capacitor 254-1 and the wireless power reception device 238 that is included in the second cable termination 230-2 of the trunk cable assembly 200 of FIG. 4 may be implemented as the first electrode 252-1 of a second capacitor 254-2. The second electrode 252-2 of the first capacitor 254-1 acts as a second wireless power reception device 238 that is provided in the remote radio head 124, and the second electrode 250-2 of the second capacitor 254-2, which is likewise provided in the remote radio head 124, acts as a second wireless power transmission device 236. A high voltage, high frequency AC power current is used to charge the first electrode 250-1 of the first capacitor 254-1. One or more dielectric materials (e.g., air, high-k dielectric constant materials, etc.) are provided between the first electrode 250-1 and the second electrode 252-2. A portion of the AC power supply signal may be capacitively coupled from the first electrode 250-1 to the second electrode 252-2 to wirelessly provide a power supply signal to the remote radio head 124. The return path for the power supply signal may be wirelessly transmitted across the second capacitor 254-2 in the same manner.

Microwave power transmission may be used in still other embodiments. With this approach, the wireless transmission device 236 may comprise a radio and an antenna that are used to convert the power supply signal into a microwave signal that is transmitted to the wireless reception device 238. The wireless reception device 238 then converts the received microwave signal back into a power supply signal. Microwave power transmission may exhibit very high efficiencies as compared to other forms of wireless power transmission.

In yet another approach, power may be wirelessly transmitted by converting electrical energy into a laser beam or other light source that is pointed at a photovoltaic cell that is used to convert the received light from the laser beam into an electrical power signal. Magnetic beam forming is another approach that may be used. With this approach, a magnetic beam or wave may be generated at a source and directed (wirelessly) at a magnetic metal that is located at the target. The magnetic beam may induce a vibration in the magnetic metal, and this mechanical energy may be converted into electrical power.

In addition to the wireless power connection, a wireless data connection may be provided between each remote radio head 124 and the second cable termination 230-2. As shown in FIG. 4, this may be accomplished, for example, by terminating the optical fibers 222 of the fiber optic data cable 220 into a wireless transceiver 260-1. The wireless transceiver 260-1 may include an optical-to-electrical converter that converts the optical data carried over the uplink optical fiber 222 into RF signals that may be transmitted by the wireless transceiver 260-1 to a corresponding wireless transceiver 260-2 that is provided at each remote radio head 124. The wireless transceiver 260-1 may also include an electrical-to-optical converter that converts the downlink data received from the remote radio head 124 into an optical signal that may be transmitted over another of the optical fibers 222 to the baseband unit 122. In some embodiments, the wireless transceivers 260-1, 260-2 may be, for example, transceivers that transmit data at low power in the millimeter-wave frequency ranges (e.g., in the 30 GHz to 85 GHz frequency range). IEEE 802.11ad transceivers, which operate in the 60 GHz frequency band, represent one suitable type of transceiver.

In some embodiments, a plurality of mated pairs of transceivers 260 may be provided at the top of the tower 130, with one transceiver 260-1 of each pair located in the second cable termination 230-2 and the other transceiver 260-2 of each pair associated with a respective one of the remote radio heads 124. In such an embodiments, each transceiver 260 of a pair can be assigned a particular frequency sub-band such that the transceivers 260 of the pair only transmit and receive signals in the assigned frequency sub-band. Each pair may be assigned to a different, non-overlapping frequency sub-band so that the wireless transmissions between the second cable termination 230-2 and the remote radio heads 124 do not interfere with each other.

In other embodiments, a single wireless transceiver 260-1 may be provided in the second cable termination 230-2, and all of the uplink and downlink optical fibers 222 may be connected to this single wireless transceiver 260-1. Appropriate multiple access techniques such as, for example, frequency division multiple access ("FDMA") techniques, time division multiple access ("TDMA") techniques and/or FDMA/TDMA techniques may be used to ensure that the uplink data carried by each uplink optical fiber 222 is received at the correct remote radio head 124, and to likewise ensure that the received downlink data is delivered to the appropriate baseband unit 122. In still other embodiments, spread spectrum multiple access techniques may be used. The transceivers 260-1, 260-2 may support data rates which may be sufficient to carry the full uplink and downlink transmissions between the remote radio heads 124 and the second cable termination 230-2. It will be appreciated that any appropriate wireless transmission technique may be used to form the wireless jumper for data transmission.

In still other embodiments, the transceivers 260 in the second cable termination 230-2 and in the remote radio heads 124 may have highly directional beamforming capabilities so that the transceiver pairs may transmit in the same frequency band but avoid interference via spatial diversity. In one example embodiment, each of the transceivers 260 in the second cable termination 230-2 and in the remote radio heads 124 may include a phased array antenna. The phased array antennas of the transceivers 260-1 in the second cable termination 230-2 may be generally pointed in one of three directions, so that each phased array antenna in the second cable termination 230-2 is generally pointed in the direction of a corresponding remote radio head 124. Likewise, the wireless transceivers 260-2 in the remote radio heads may all have phased array antennas that generally point towards the second cable termination 230-2.

In some embodiments, a calibration process may be used to determine the weights used on each radiating element of the phased array. For example, the phased array antenna on the first transceiver 260-1 of a transceiver pair may start by sending out a broad-beam signal that is received by the second transceiver 260-2 of the pair. The first transceiver 260-1 then sends out a second signal using a narrower beam that covers, for example the right-half of the first beam, and then sends out a third signal that covers the left half of the first beam. The second transceiver 260-2 of the pair determines which of the second and third signals is stronger, and notifies the first transceiver 260-1 of the pair as to which received signal was stronger. The first transceiver 260-1 then repeats this process by sending out two additional signals, one for each half of the beam associated with the stronger received signal. By this process, the beam of the phased array antenna of the first transceiver 260-1 of the pair may be progressively narrowed so that a narrow beam is formed that points directly at the second transceiver 260-2 of the pair. This calibration process may be performed for each of the phased array antennas in order to implement spatial diversity so that all of the transceivers can transmit and receive signals in the same frequency band. Various methods for implementing beamsteering are discussed, for example, in an article by Abbas Abbaspour-Tamijani and Kamal Sarabandi available at http://citeseerx.ist.psu.edu/viewdoc/download?doi=10.1.1.132.8520&rep=rep1&type=pdf and in an article available at http://www.ece.ucsb.edu/wcsl/Publications/eric_itwc2011.pdf, each of which are incorporated herein by reference.

Referring again to FIG. 4, it can be seen that the first cable termination 230-1 may be identical to the second cable termination 230-2. Accordingly, further description thereof will be omitted here.

Figure 6A:
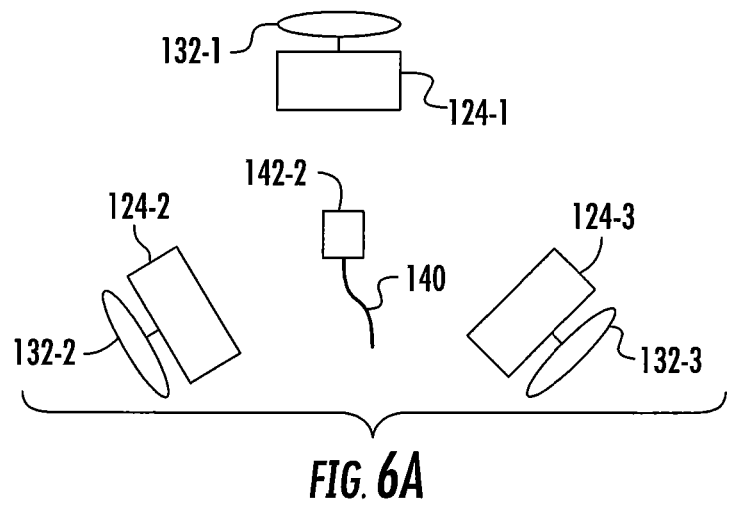
FIGS. 6A-6C are schematic block diagrams showing the configurations of the remote radio heads, antennas and trunk cables of cellular base stations according to various embodiments of the present invention.
Figure 6B:
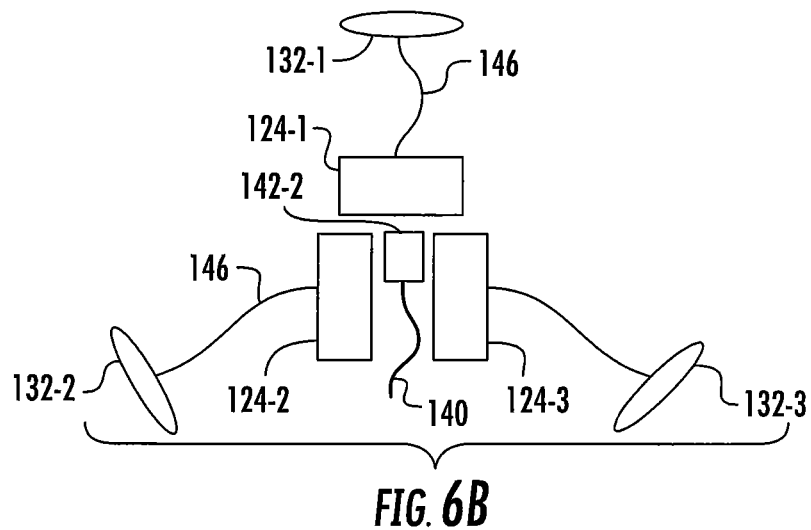
Figure 6C:
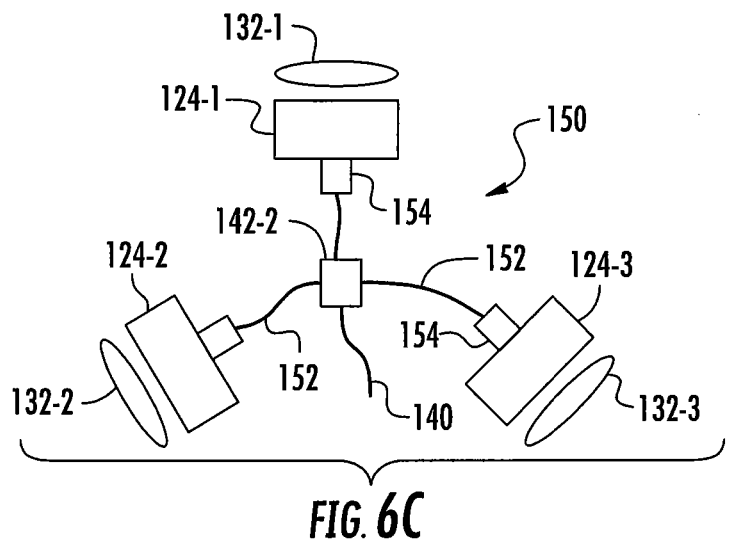

FIGS. 6A-6C are schematic block diagrams showing the configurations of the remote radio heads, antennas and trunk cables of cellular base stations according to various embodiments of the present invention. These configurations may be used, for example, in the cellular base station 100 of FIG. 3.

As shown in FIG. 6A, in a first configuration, the three antennas 132-1, 132-2, 132-3 may be positioned to form an equilateral triangle. Three remote radio heads 124-1, 124-2, 124-3 may be positioned immediately adjacent the respective antennas 132. The second cable termination 142-2 may be located generally in the center of the tower 130, and may be separated by, for example, 5-15 feet from each of the remote radio heads 124. Each remote radio head 124 may be positioned in very close proximity to its corresponding antenna 132 to reduce RF signal losses in the coaxial cable connections between each remote radio head 124 and its corresponding antenna 132.

As shown in FIG. 6B, in a second configuration, the three antennas 132-1, 132-2, 132-3 may again be positioned to form an equilateral triangle. The three remote radio heads 124-1, 124-2, 124-3 may be positioned immediately adjacent to respective sides of the second cable termination 142-2. This may provide for more efficient wireless power transmission between the second cable termination 142-2 and the respective remote radio heads 124. In this configuration, longer coaxial cable connections 146 may be required between each of the remote radio heads 124 and its corresponding antenna 132. These longer connections may result in increased RF signal losses.

As shown in FIG. 6C, in a third configuration, the three antennas 132-1, 132-2, 132-3 may again be positioned to form an equilateral triangle. The three remote radio heads 124-1, 124-2, 124-3 may be positioned immediately adjacent the respective antennas 132, as in the first configuration of FIG. 6A. The second cable termination 142-2 is located generally in the center of the tower 130, and may be separated by, for example, 5-15 feet from each of the remote radio heads 124. In this embodiment, the second cable termination 142-2 includes a plurality of flexible extensions 150. Each flexible extension 150 may comprise a cable segment 152 having a small enclosure 154 on an end thereof. The cable segment 152 may include, for example, an uplink optical fiber 222-1, a downlink optical fiber 222-2, a positive power conductor 212 and a negative power conductor 214, all of which may be enclosed in a protective jacket or conduit. The enclosure 154 may include a wireless power transmission device 236, a wireless power reception device 238 and a wireless transceiver 260. Each of these components may operate in the same manner as the corresponding components of FIG. 4, so further description thereof will be omitted. The enclosure 154 may be designed to be easily attached to a respective one of the remote radio heads 124 via, for example, snap clips, a magnetic connection, insertion within a receptacle on the remote radio head 124, etc. The attachment point for the enclosure 154 on the remote radio head 124 may be immediately adjacent a wireless power transmission device 236, a wireless power reception device 238 and a wireless transceiver 260 of the remote radio head 124. In this design, the antennas 132 may be located in very close proximity to their corresponding remote radio heads 124 in order to provide low RF signal loss levels, and the wireless power transmission and reception devices of the second cable termination 142-2 and the remote radio heads 124 may likewise be located immediately adjacent to each other in order to ensure efficient wireless power transmission.

Pursuant to further embodiments of the present invention, wireless jumpers may be used to reduce power losses associated with delivering a power signal to the remote radio heads 124.

The DC voltage of a power signal that is supplied to a remote radio head from a power supply over a power cable may be determined as follows:

$$V_{RRH} = V_{PS} - V_{Drop} \quad (1)$$

where $V_{RRH}$ is the DC voltage of the power signal delivered to the remote radio head, $V_{PS}$ is the DC voltage of the power signal that is output by the power supply, and $V_{Drop}$ is the decrease in the DC voltage that occurs as the DC power signal traverses the cabling from the power supply to the remote radio head. $V_{Drop}$ may be determined according to Ohm's Law as follows:

$$V_{Drop} = I_{RRH} * R_{Cable} \quad (2)$$

where $R_{Cable}$ is the electrical resistance (in Ohms) of the power cable connecting the power supply to the remote radio head and $I_{RRH}$ is the average current (in Amperes) flowing through the power cable to the remote radio head.

The electrical resistance $R_{Cable}$ of the power cable is inversely proportional to the diameter of the conductor of the power cable. Thus, the larger the diameter of the conductor (i.e., the lower the gauge of the conductor), the lower the resistance of the power cable. Typically, power cables utilize copper conductors due to the low resistance of copper. Copper resistance is specified in terms of unit length, typically milliohms (m$\Omega$)/ft for a specified cross-sectional area; as such, the cumulative electrical resistance of the power cable increases with the length of the cable. Thus, the longer the power cable, the higher the voltage drop $V_{Drop}$.

Typically, a minimum required supply voltage, a nominal or recommended supply voltage and a maximum supply voltage will be specified for the remote radio head. Thus, the power supply must output a voltage Vps such that $V_{RRH}$ will be between the minimum and maximum supply voltages of the remote radio head. As $V_{Drop}$ is a function of the current $I_{RRH}$ that is supplied to the remote radio head (see Equation 2 above), if $V_{PS}$ (the voltage output by the power supply) is constant, then the voltage $V_{RRH}$ that is delivered to the remote radio head will change with the variation in current drawn by the remote radio head. Conventionally, the voltage output by the power supply ($V_{PS}$) is set to ensure that the nominal supply voltage is supplied to the remote radio head (or at least a value above the minimum supply voltage) when the remote radio head draws the maximum anticipated amount of current.

The power that is lost ($P_{Loss}$) in delivering the power supply signal to the remote radio head over a power cable may be calculated as follows:

$$P_{Loss} = V_{Drop} * I_{RRH} = (I_{RRH} * R_{Cable}) * I_{RRH} = I_{RRH}^2 * R_{Cable} \quad (3)$$

Thus, the higher the current flowing through the power cable to the remote radio head the higher the power loss.

Figure 2:
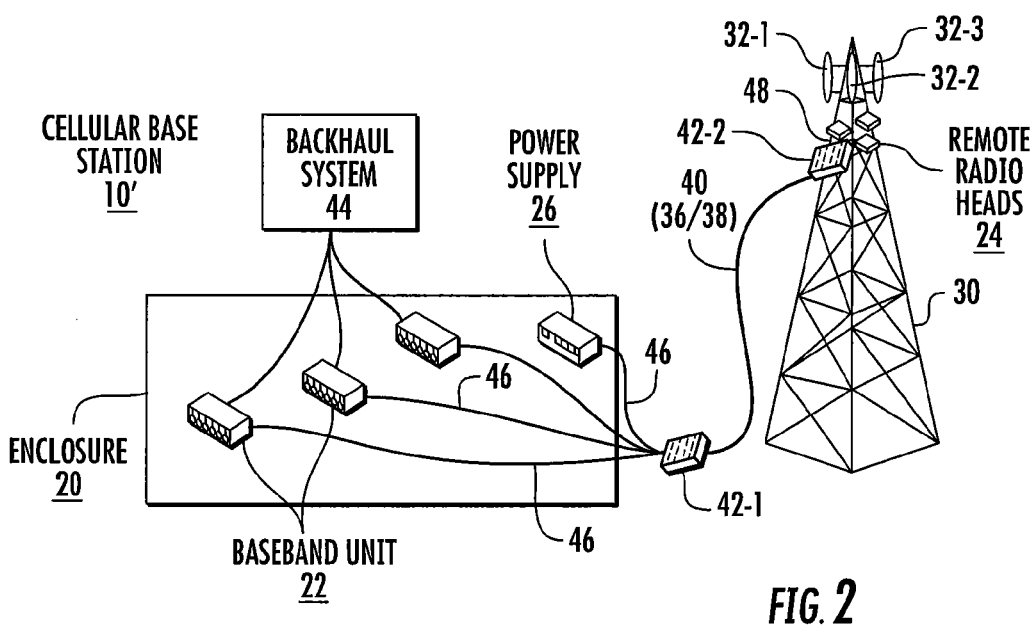
FIG. 2 is a simplified, schematic view of another conventional cellular base station in which remote radio heads are used that are located at the top of the tower.

As noted above, when conventional trunk cables are used as in the conventional cellular base station 10' of FIG. 2 that is discussed above, technicians must connect jumper cables from the breakout box 42-2 at the top of the tower 30 to each remote radio head 24 in order to provide power and data connections to each remote radio head 24. This, in turn, requires that a technician open the breakout box 42-2 at the top of the tower 30, connect each jumper cable 46 between the breakout box 42-2 and the remote radio heads 24, and then close the breakout box 42-2. This practice can create many issues for installers, including time, safety, connection errors (such as loose power connections and/or poor fiber cleaning), and more opportunity for connector damage. Moreover, because of the safety concerns, the voltage $V_{RRH}$ (i.e., the DC voltage of the power signal delivered to the remote radio head) may be limited to a maximum value based on, for example, safety regulations. Accordingly, the use of higher voltages may not be available as a mechanism for reducing the current $I_{RRH}$ as a means of reducing the power loss (since the power loss increases as a square of the current $I_{RRH}$).

As noted above, pursuant to embodiments of the present invention, trunk cable assemblies having factory-sealed cable terminations 142-1, 142-2 may be used in place of combination of a trunk cable 40 and breakout boxes 42-1, 42-2 that are used in conventional approaches, since there is no need to connect power or data jumper cables within breakout boxes. When such a sealed cable terminations 142-1, 142-2 are used, each cable termination 142-1, 142-2 may further include a buck power converter or a boost power converter. In particular, cable termination 142-1 may include a boost power converter that may increase the DC voltage that is wirelessly provided from the power supply 126 to cable termination 142-1 to a much higher DC voltage (e.g., a 50 Volt DC power supply signal may be provided by the power supply may be increased to, for example, 300 Volts). This 300 Volt DC power supply signal may then be carried up the tower 130 through the power cable 210 of trunk cable 140. The cable termination 142-2 may include a buck converter that decreases the DC voltage from, for example, 295 Volts (here we are assuming a voltage drop of 5 Volts) to 50 Volts, or some other voltage that is appropriate for provision to the remote radio heads 124. Since the voltage $V_{RRH}$ of the power supply signal that is carried by power cable 210 is much higher than normal, the current $I_{RRH}$ on the power cable 210 is reduced linearly, and the power loss $P_{Loss}$ is reduced exponentially. This may reduce the cost of powering the remote radio heads 124 and thereby reduce the operating costs of the cellular base station 100. As a typical remote radio head 124 may require about a kilowatt of power and is run twenty-four hours a day, seven days a week, the operational cost savings may be significant.

Figure 7:
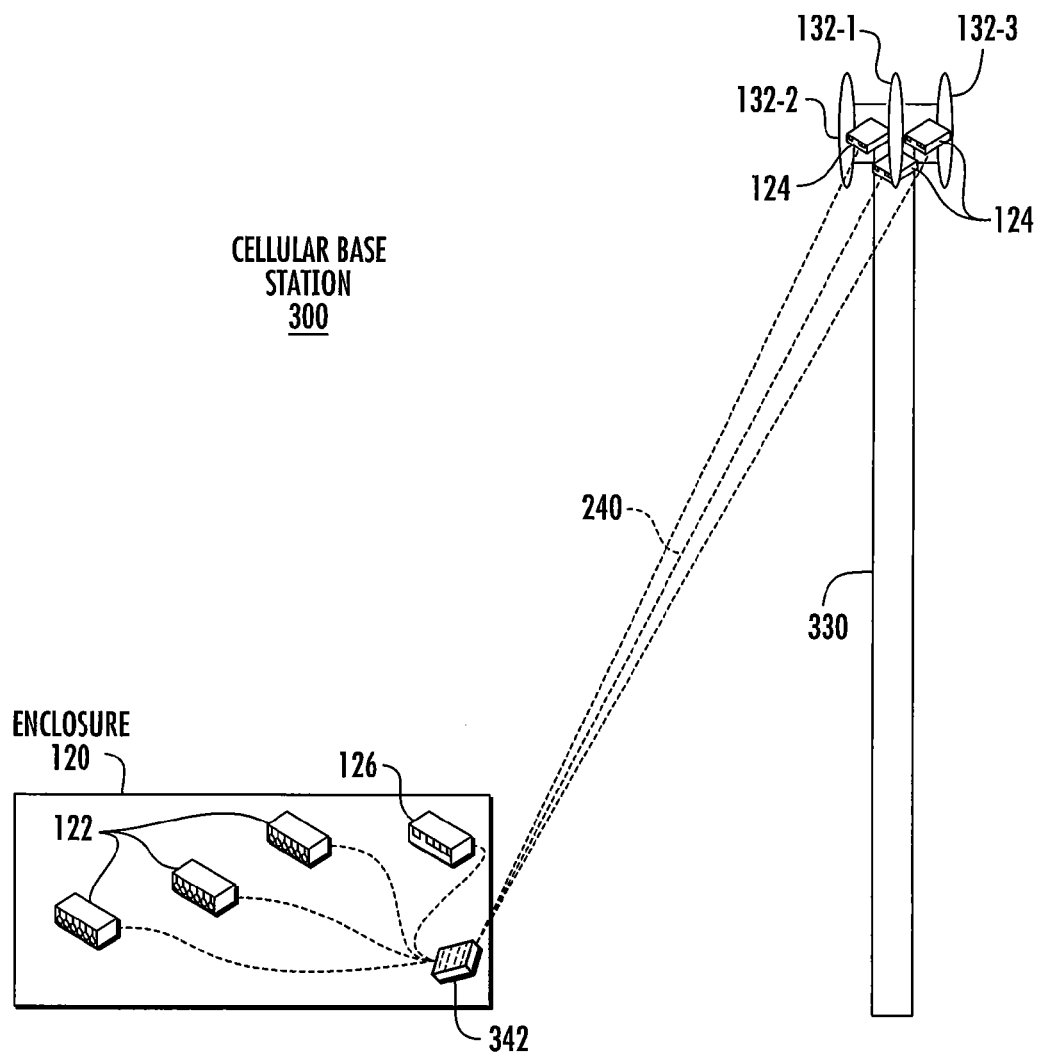
FIG. 7 is a simplified, schematic view of a cellular base station according to further embodiments of the present invention.

FIG. 7 is a simplified, schematic view of a cellular base station 300 according to further embodiments of the present invention. As shown in FIG. 7, the cellular base station 300 is similar to the cellular base station 100 that is described above with reference to FIG. 3. However, in the embodiment of FIG. 7, the cellular base station 300 is a so-called "metro-cell" base station which refers to a lower power type of cellular base station that is commonly implemented in urban areas atop telephone poles or other structures that are smaller than conventional cellular antenna towers. In the depicted embodiment, antennas 132 and remote radio heads 124 are mounted on a telephone poll 330 which may be, for example, about 20-30 feet tall. In the embodiment of FIG. 7, wireless power and data transmission is used to carry the power and data signals from the enclosure 120 to the top of the telephone pole 330. As such, the trunk cable 140 of FIG. 3 is replaced with a cable termination 342. The cable termination 342 receives data from the baseband units 122 over wired connections, and also receives a DC power supply signal from the power supply 126. Each remote radio head 124 includes a wireless power transmission device, a wireless power reception device and a wireless transceiver, as is discussed above with reference to FIG. 5. The wireless power and data jumpers extend from the cable termination 342 to the remote radio heads 124. Thus, in the embodiment of FIG. 7, no trunk cable is required. This provides additional advantages, including decreased weight and wind loading on the telephone pole 330, and elimination of the risk of theft of a trunk cable, which is all too common due to the high price of copper. This approach may also be used in conventional cellular base stations.

In some cellular installations, data may be transmitted to the antennas, the data being used to control the antennas or to collect sensor data from the antennas. The Antenna Interface Standards Group ("AISG") is a non-profit consortium that has developed a standard for digital remote control and monitoring of antennas and related equipment used in the wireless industry. Pursuant to the AISG standard, an RS-485 multi-device wired communication bus is provided that may carry control signals used to control, for example, tower-mounted power amplifiers and low noise amplifiers, antenna tilt control devices, other antenna control units and the like. The devices that receive AISG signals are referred to herein as "antenna line devices." The communication bus may be configured, for example, in a daisy chain configuration or a star configuration in order to connect, for example, multiple antenna line devices on a tower to ground-based controller. The communication bus connects directly to each of the antenna line devices.

The AISG control signals may include, for example, location information that is provided by Global Positioning Satellite transceivers that are included in the antenna line devices (which may allow a wireless carrier to confirm that the antenna line devices were installed in the correct location), alarm signals (e.g., if a tilt angle of an antenna exceeds a predefined threshold), control signals for antenna movement or beamsteering, etc. The antenna line device controller may initiate all communications with the antenna line devices.

Pursuant to further embodiments of the present invention, the RS-485 communication bus AISG signals may be converted to an appropriate wireless signal, transmitted to the antenna line devices, and then converted back into an RS-485 signal. In some embodiments, the RS-485 cable may be incorporated into the aforementioned trunk cable assemblies. One or more additional wireless transceivers may then be included in one or both trunk cable terminations that convert the RS-485 bus signals into a wireless signal, and transmit the wireless signal to the one or more antenna line devices. The antenna line devices may convert the received wireless signal back into an RS-485 bus signal that is used to control the antenna line devices. Wireless power jumpers may also be included in each of the antenna line devices that provide the power necessary to power the AISG bus and the active circuitry in the antenna line devices (e.g., processors, tilt motors, etc.). Any of the wireless power techniques previously described may be used, and hence further description of the wireless power jumpers used to power the antenna line devices will be omitted here.

AISG signals are relatively low data rate communications. Accordingly, a number of different low data rate wireless solutions may be used to implement the wireless data jumpers from the trunk cable termination to the antenna line devices such as, for example, Bluetooth or Zigbee communications. Bluetooth and Zigbee are both low power consumption, low cost wireless networking protocols that may be incorporated into the antenna line devices and the trunk cable terminations. Moreover, since some low cost, low data rate protocols such as, for example, Zigbee have fairly extended ranges (e.g., up to 75 meters), in some embodiments, the wireless AISG communications may be transmitted from the bottom of the tower to the antenna line devices, thereby avoiding any need to incorporate the RS-485 cable into the trunk cable (or to run a separate RS-485 cable up the tower).

Figure 8A:
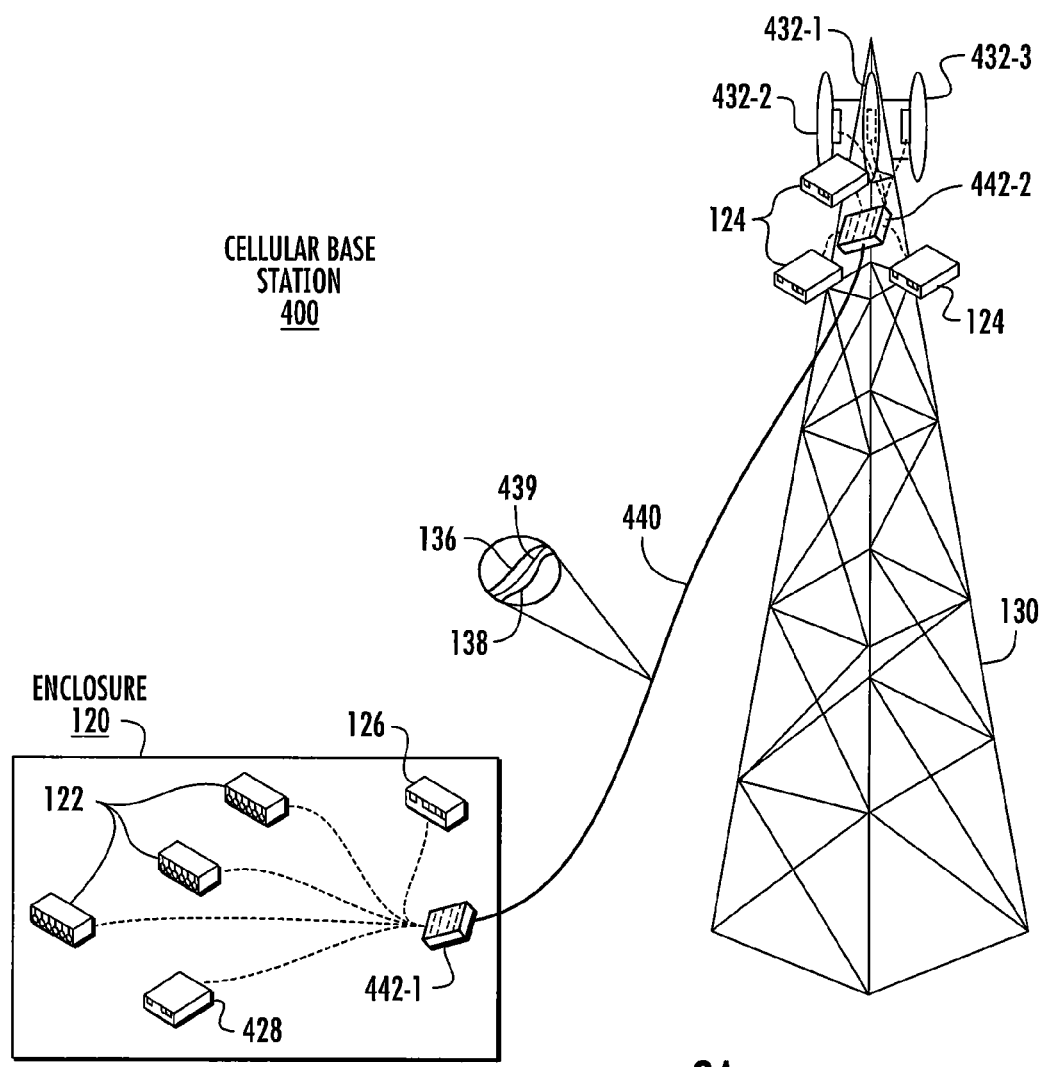
FIG. 8A is a simplified, schematic view of a cellular base station according to still further embodiments of the present invention that includes wireless jumpers for ASIG communications to antenna line devices.

FIG. 8A is a simplified, schematic view of a cellular base station 400 according to still further embodiments of the present invention that includes wireless jumpers for AISG communications to antenna line devices. As shown in FIG. 8A, the cellular base station 400 is similar to the cellular base station 100 that is described above with reference to FIG. 3. However, the cellular base station 400 further includes an antenna line device controller 428 that may be located, for example, in the enclosure 120, and each of the antennas comprise antenna line devices 432 that are powered devices. A trunk cable assembly is provided that includes a trunk cable 440 and first and second trunk cable terminations 442-1, 442-2. The trunk cable 440 is similar to the trunk cable 140 described above with reference to FIG. 3, except that it further includes an RS-485 cable 439. The first and second trunk cable terminations 442-1, 442-2 are similar to the first and second trunk cable terminations 142-1, 142-2 that are described above, except that each trunk cable termination 442-1, 442-2 further includes one or more low-power transceivers such as Zigbee transceivers. As described above, the low-power transceivers in the second trunk cable termination 442-2 may convert AISG control signals that are received over the RS-485 cable 439 to an appropriate wireless signal, and then transmit the wireless signal to corresponding low-power transceivers that are provided in the antenna line devices 432. The low-power wireless transceivers may also receive wireless communications that are transmitted by the low-power wireless transceivers in the antenna line devices 432 and convert these received signals into RS-485 signals that are then transmitted to the antenna line device controller 428 over the RS-485 cable 439. The second cable termination 442-2 may also include a plurality of wireless power jumpers that wirelessly transmit a power supply signal to each of the antenna line devices 432.

Figure 8B:
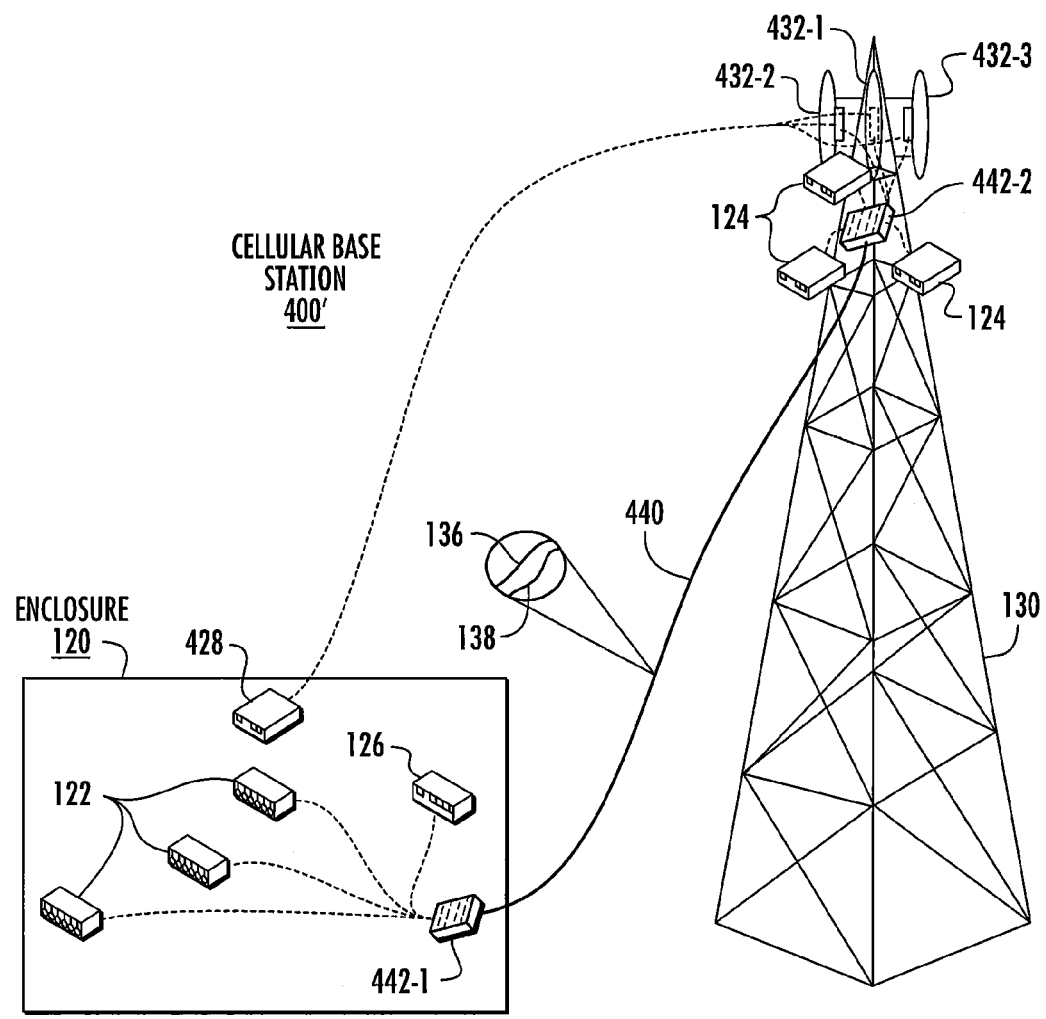
FIG. 8B is a schematic view of a modified version of the cellular base station of FIG. 8A.

FIG. 8B is a schematic view of a cellular base station 400' that is a modified version of the cellular base station 400 of FIG. 8A. As is readily apparent, the primary difference between the cellular base stations 400 and 400' is that in the cellular base station 400' the RS-485 cable 439 is omitted, and the AISG signals are wirelessly transmitted from the antenna line device controller 428 that is located at the bottom of tower 130 to the antenna line devices 432 at the top of tower 130. An appropriate wireless data transmission protocol such as Zigbee may be used that has sufficient range to wirelessly transmit the AISG control signals from the bottom of the tower 130 to the top of the tower 130 with sufficient quality of service. The power supply signal for the antenna line devices 432 may be wirelessly transmitted to each antenna line device 432 from the second cable termination 442-2.

Figure 8C:
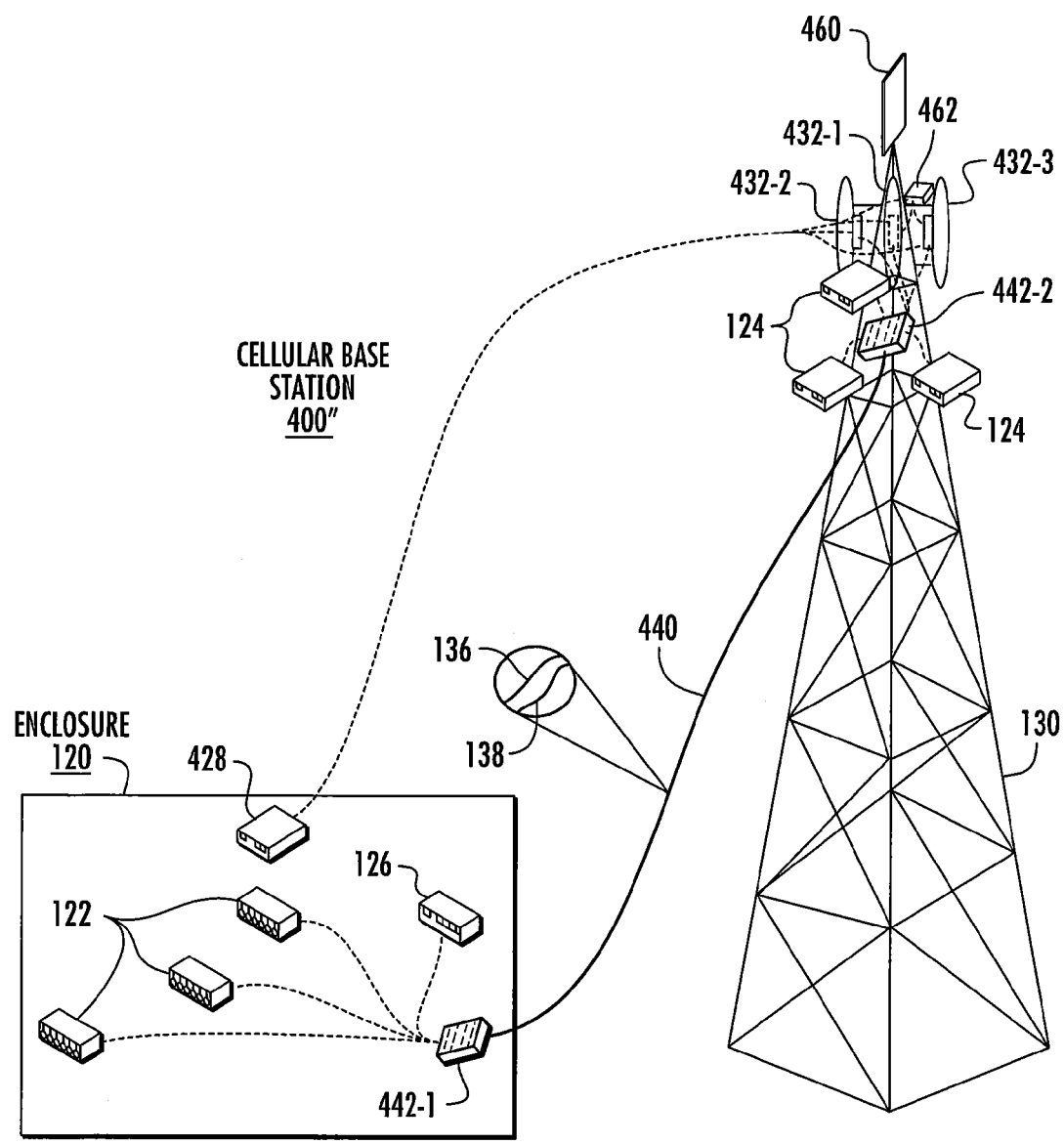
FIG. 8C is a schematic view of another modified version of the cellular base station of FIG. 8A.

FIG. 8C is a schematic view of a cellular base station 400" that is another modified version of the cellular base station 400 of FIG. 8A. As is readily apparent, the primary difference between the cellular base stations 400 and 400" is that in the cellular base station 400", wireless power connections are not provided to the antenna line devices 432 and, instead, these devices 432 are powered via a solar cell 460 and a rechargeable battery or hydrogen fuel cell 462. Such an arrangement is possible because the antenna line devices 432 may be very low-power devices that can be run off of battery power. The solar cell 460 is provided to recharge the battery/fuel cell 462 in order to avoid the need for tower climbs to replace worn out batteries. It will be appreciated that the embodiment of FIG. 8B may likewise be modified to power the antenna line devices 432 via the solar cell 460 and batteries/hydrogen fuel cell 462.

While embodiments of the present invention have primarily been described above with reference to conventional remote radio heads, it will be appreciated that a new generation of remote radio heads is under development that combine the remote radio head and the base station antenna into a single unit that receives digital data and outputs a radiated RF signal. Remote radio heads having this new configuration are sometimes referred to as "active antennas." Active antennas may place the transceiver very close to the radiating elements of the antenna structure and eliminate the need for a traditional cabling connection between the remote radio head and the antenna, which may reduce signal loss (since the signal transmitted by the remote radio head is at cellular RF frequencies, and signal losses are high when transmitting such signals over coaxial cable). In active antenna arrangements, the high power amplifier may be incorporated into the radiating elements, so low power RF signals may pass between the transceiver and the amplifier/radiating elements on, for example, a short path on a printed circuit board. Signal losses may be significantly lower due to the elimination of cabling connectors, the reduction in the length of the RF signal path and the transmission of a lower power RF signal. Thus, it will be appreciated that all of the embodiments disclosed herein may be implemented using either or both conventional remote radio heads and/or active antennas as the cellular radios.

Likewise, embodiments of the present invention have primarily been described above with respect to conventional cellular base stations that have antennas mounted on an antenna tower. It will be appreciated, however, that all of the above described embodiments may be implemented in cellular base stations in which the cellular radios (i.e., conventional remote radio heads and/or active antennas) are mounted on other tower structures such as on the sides or tops of buildings, water towers, utility poles and the like, or inside structures such as stadiums, shopping malls, tunnels and the like.

The techniques according to embodiments of the present invention may offer a number of advantages. For example, the wireless data connections may reduce or eliminate the need for cleaning fiber optic connectors, stocking, ordering and distributing jumpers of particular lengths, testing fiber optic links, and the like. The installation of the equipment at the top of the tower may be simplified significantly, and may be made much safer and less expensive. The use of factory-sealed trunk cable assemblies may allow the use of higher voltage power supply signals, which may reduce power losses. Additionally, with the use of wireless power transmission techniques it is likely that remote radio heads will be developed that are powered by AC power supply signals. As AC power supply signals may generally be transmitted more efficiently than DC power supply signals, this may further reduce power losses.

Additionally, as discussed above, in some embodiments the wireless power and/or data transmission may be performed from the equipment enclosure at the bottom of the tower. In such embodiments, the need for a trunk cable can be eliminated entirely. Trunk cables are expensive to purchase, expensive to install, and create significant loads on the tower that require more robust tower structures. As such, the use of trunk cables can significantly increase the expense of a cellular base station. Additionally, because trunk cables include a large amount of copper cabling (for the power conductors), they are subject to theft. Theft of a trunk cable not only requires replacement of the trunk cable, but also shuts down operation of the cellular base station and may result in associated damage to equipment at the site.

The present invention has been described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. Like numbers refer to like elements throughout the specification and drawings. It will also be appreciated that the embodiments disclosed above can be combined in any way and/or combination to provide many additional embodiments.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A trunk cable assembly for a cellular base station, comprising:
   a trunk cable that includes a conductive power cable and a fiber optic data cable;
   a trunk cable termination that is directly attached to the trunk cable, the trunk cable termination including:
   an enclosure;
   a wireless power unit that is electrically connected to the conductive power cable;
   an optical-to-electrical converter that is coupled to an optical fiber of the fiber optic data cable; and
   a wireless transceiver that is coupled to an output of the optical-to-electrical converter,
   wherein the wireless power unit, the optical-to-electrical converter and the wireless transceiver are within the enclosure,
   wherein the wireless power unit is configured to wirelessly transmit power to a tower-mounted radio of the cellular base station and the wireless transceiver is configured to wirelessly transmit data to the tower-mounted radio of the cellular base station.

2. The trunk cable assembly of claim 1, wherein a common jacket encloses the conductive power cable and the fiber optic data cable to provide a hybrid fiber optic-power trunk cable, and wherein the enclosure is a permanently-sealed enclosure.

3. The trunk cable assembly of claim 2, wherein the wireless power unit is configured to receive an alternating current ("AC") power signal.

4. The trunk cable assembly of claim 3, wherein the enclosure further includes a buck converter for reducing a voltage of the AC power signal.

5. The trunk cable assembly of claim 1, wherein the wireless power unit comprises a resonant magnetic coupling wireless power unit.

6. The trunk cable assembly of claim 1, wherein the wireless transceiver is configured to communicate with a plurality of tower-mounted radios.

7. The trunk cable assembly of claim 1, wherein the wireless transceiver includes a phased array antenna.

8. A trunk cable assembly for a cellular base station, comprising:
   a trunk cable that includes a conductive power cable and a fiber optic data cable;
   a trunk cable termination that is directly attached to the trunk cable, the trunk cable termination including:
   an enclosure;
   a wireless power unit that is electrically connected to the conductive power cable;
   an optical-to-electrical converter that is coupled to an optical fiber of the fiber optic data cable; and
   a wireless transceiver that is coupled to an output of the optical-to-electrical converter,
   wherein the wireless power unit, the optical-to-electrical converter and the wireless transceiver are within the enclosure,
   wherein the enclosure further includes a second optical-to-electrical converter that is coupled to a second optical fiber of the fiber optic data cable and a second a wireless transceiver that is coupled to an output of the second optical-to-electrical converter.

9. The trunk cable assembly of claim 8, wherein the wireless transceiver and the second wireless transceiver are positioned on different sides of the enclosure.

10. A trunk cable assembly, comprising:
    a trunk cable that includes a conductive power cable;
    a trunk cable termination that is connected to the trunk cable and that is part of the trunk cable assembly, the trunk cable termination including:
    a first enclosure;
    a plurality of flexible extensions extending from the first enclosure, each flexible extension comprising a cable segment having a respective second enclosure, each second enclosure including a wireless power unit.

11. The trunk cable assembly of claim 10, wherein the trunk cable further includes a fiber optic data cable, and each second enclosure further includes an optical-to-electrical converter.

12. The trunk cable assembly of claim 11, wherein each second enclosure further includes a wireless transceiver that is coupled to an output of a respective one of the optical-to-electrical converters.

13. The trunk cable assembly of claim 10, wherein each cable segment includes a positive power conductor and a negative power conductor.

14. The trunk cable assembly of claim 10, wherein each second enclosure includes an attachment mechanism for attaching to a radio.

* * * * *